(12) United States Patent
Hoffmann

(10) Patent No.: US 8,074,529 B2
(45) Date of Patent: Dec. 13, 2011

(54) ARRANGEMENT FOR REDUCING RATTLING IN A TRANSMISSION

(75) Inventor: Rayk Hoffmann, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 409 days.

(21) Appl. No.: 12/476,736

(22) Filed: Jun. 2, 2009

(65) Prior Publication Data

US 2009/0301240 A1   Dec. 10, 2009

(30) Foreign Application Priority Data

Jun. 9, 2008   (DE) .......................... 10 2008 002 294

(51) Int. Cl.
*F16H 3/08*   (2006.01)
(52) U.S. Cl. ......................................................... 74/330
(58) Field of Classification Search .................. None
See application file for complete search history.

(56) References Cited

U.S. PATENT DOCUMENTS 7,334,493 B2   2/2008   Renner

FOREIGN PATENT DOCUMENTS

| DE | 102 34 579 A1 | 2/2004 |
| DE | 103 34 460 A1 | 5/2005 |
| DE | 10 2004 057 126 A1 | 6/2006 |
| DE | 10 2006 008 207 A1 | 9/2006 |
| DE | 10 2008 000 820 | 3/2008 |

*Primary Examiner* — Dirk Wright
(74) *Attorney, Agent, or Firm* — Davis & Bujold, P.L.L.C.

(57) ABSTRACT

An arrangement for reducing rattling in a transmission of counter shaft design having first countershafts (3, 4) and a load-equalizing main shaft (7) in which each transmission ratio step comprises a loose wheel (6), arranged on the main shaft (7), and a respective fixed wheel (5) arranged on each of the first and second countershafts (3, 4) which are in active engagement with one another. Activation of the transmission ratios occurs by actuating a shift element (8) such that the respective loose wheel can be connected, in a rotationally fixed manner, to the main shaft (7). In this arrangement the oil pump (13) of the transmission is mounted on the main shaft (7).

5 Claims, 1 Drawing Sheet

ARRANGEMENT FOR REDUCING RATTLING IN A TRANSMISSION

This application claims priority from German patent application no. 10 2008 002 294.2 filed Jun. 9, 2008.

FIELD OF THE INVENTION

The present invention relates to an arrangement for reducing rattling in a transmission of countershaft design, comprising two countershafts and a main shaft.

BACKGROUND OF THE INVENTION

From the prior art multi-stage change-speed transmissions with two countershafts and a central main shaft are known. In these, the individual gears are produced by activating in each case a gear ratio step that comprises a loose wheel, which is arranged on the main shaft, and a respective fixed wheel, which is arranged on each countershaft, which are in active engagement with one another. The activation of the gear ratio steps takes place by actuating a shift element by means of which the loose wheel concerned can be connected in a rotationally fixed manner to the main shaft. Accordingly, the loose wheels arranged on the main shaft rotate in the circumferential direction loosely along with the main shaft and are only connected in a rotationally fixed manner to the main shaft in order to transmit torque when the associated gear step is in use.

Chattering and rattling noises are produced by transmission components when not under load, such as loose wheels, synchronization rings and shifting sleeves, due to low-frequency torsional oscillations introduced into the transmission by the drive input or drive output shafts. Vibration of loose components can also be produced by the self-excitation of transmission-internal components, which can as a rule be attributed to tooth defects, play between the tooth flanks and/or imbalances. The difference between rattling and chattering is as follows: loose component instabilities that occur during traction or thrust operation are called rattling, whereas in contrast, chattering only takes place while idling, i.e. while the transmission is in the neutral position.

The loose wheels of a multi-stage change-speed transmission with two countershafts and a central main shaft are mounted on the main shaft with some radial play in order to enable load equalization between the force flows via the two countershafts, and are guided radially by the teeth of the fixed wheels on the countershafts within the range of their radial movement play on the main shaft, so that when a gear is engaged the corresponding loose wheel is centred under load between the teeth of the fixed wheels on the countershafts. During torque transmission this gives the optimum load equalization between the countershafts. The loose wheels associated with unengaged gears are in a load-free condition and float in the radial direction and in the circumferential direction within the tooth play range.

In the axial direction the loose wheels are as a rule held in place on the main shaft by thrust washers, with each loose wheel between two thrust washers arranged on the main shaft. Yet, there is also some play in the axial direction, which results from manufacturing tolerances and a gap required for oil lubrication.

However, the radially movable mounting of the loose wheels and the axial play result in an unpleasant rattling noise during operation, because the gearwheels of the gears that co-rotate while not under load, which are not involved in the force flow, undergo accelerations in the circumferential, axial and radial directions caused by manufacturing imprecision and rotation oscillations from the drive input and/or output. These accelerations move the loose wheels within the range of their play clearance in such manner that they impact against adjacent components. In particular, the tooth flanks of the engaged teeth impact against one another, this being the main cause of the rattling noise produced by co-rotating gears which are not under load.

From DE 103 34 460 A1 by the present applicant a drivetrain of a motor vehicle is known, in particular a vehicle with all-wheel drive, which comprises a change-speed transmission driven by a motor, in which at least one brake is engaged in the drivetrain, by means of which rotational oscillations in the drivetrain usually caused by shifting under load can be braked.

In this case the at least one brake is preferably arranged in the transfer case; alternatively, it can be arranged between the transfer case and the rear wheels, or before or after the change-speed transmission in the drive input direction.

In DE 103 34 460 A1 it is also proposed to arrange sensors in the drivetrain in order to detect changes under load; in this way, after changes under load have been detected by the sensors the drivetrain can be braked. Here, the sensors are preferably arranged on the wheels of the vehicle.

From DE 102 34 579 A1 a transmission is known, particularly for a utility vehicle, which contains a transmission brake, a lubrication oil pump and at least one countershaft, such that the transmission brake and the lubrication oil pump form a unit connected to a countershaft.

From DE 10 2006 008 207 A1 a method is known for reducing undesired noise, in particular rattling noises, in a parallel-shift transmission, in particular an inactive partial transmission of a parallel-shift transmission, such that the parallel-shift transmission comprises at least two partial transmissions, with a plurality of gears, that act on a common drive output shaft, and a respective clutch for each partial transmission, such that a driveshaft of a motor can be brought into torque engagement with the output shaft selectively by means of one of the partial transmissions with its associated clutch engaged. In this case it is proposed that if undesired noise occurs, the engaged clutch of the active part-transmission should be actuated so as to modify its slip. In particular, it is proposed to actuate the engaged clutch of the active part-transmission in such manner that its slip increases.

Furthermore, from DE 10 2004 057 126 A1 a device is known for reducing the axial movement of loose wheels arranged on the main shaft in a transmission with at least two countershafts, such that for at least one of the wheels on the main shaft a pressing device arranged on the main shaft presses the associated main shaft wheel in the axial direction against a thrust washer. This is intended to avoid undesired rattling noises.

In addition, from the not yet published document DE 10 2008 000 820 by the present applicant a device for reducing rattling noises in a multi-stage transmission with two countershafts is known, in which at least one gearwheel in at least one gear of the multi-stage transmission has conical teeth, such that the gearwheel with the conical teeth or a gearwheel that meshes with the gearwheel is mounted so that it can move axially, and such that the gearwheel having conical teeth and the gearwheel that meshes with it are pressed against one another in the axial direction by at least one elastic element.

In the solutions known from the prior art for rattling noise reduction additional components are used, with adverse effect on the production and assembly costs. Furthermore, these components often act disadvantageously as sources of loss that affect the efficiency of the transmission.

Nowadays, demands concerning the suppression of noise emission by motor vehicles, in particular utility vehicles, are becoming stricter. Particularly in the case of transmissions with a countershaft structure comprising two countershafts and a central main shaft, there is a need for improvement in relation to the reduction of rattling noises.

SUMMARY OF THE INVENTION

The purpose of the present invention is to indicate an arrangement for reducing rattling in a transmission of countershaft design comprising two countershafts and a main shaft, by means of which rattling noises are substantially reduced. In particular, this rattle reduction should not produce any additional sources of loss in the transmission and should be achieved without additional components.

Accordingly, in a transmission of countershaft design comprising two countershafts having fixed wheels and a main shaft mounted in a load-equalizing manner and having loose wheels, in which the individual gears are produced by activating, in each case, a transmission ratio step comprising a loose wheel arranged on the main shaft and a respective fixed wheel on each countershaft which are in active engagement with one another, the transmission ratios being activated by actuating a shift element by means of which the loose wheel can be connected in a rotationally fixed manner to the main shaft, it is proposed to arrange the transmission oil pump for supplying the transmission with the pressure and lubrication oil required for its operation, particularly for supplying oil to shift elements, gearteeth and bearings, on the main shaft.

Thanks to the concept according to the invention, namely to arrange the oil pump of the transmission not on one of the countershafts as known from the prior art, but instead on the main shaft, a significant reduction of rattling noises up to 3 dB is achieved. In this, the hydrodynamic lubrication film and the play of the rotor of the transmission oil pump provide the damping required for reducing the rattling noises.

Preferably, the play of the pump rotor is larger than the play of the main shaft required for load equalization. Viewed axially, it is also preferable to arrange the pump close to the device for producing the reverse gear, which gives a better result because owing to the necessary rotation direction reversal, the reverse gear involves more engagements between gearteeth. For example, the oil pump can be made as an internal gearwheel pump.

BRIEF DESCRIPTION OF THE DRAWINGS

Below, an example of the invention is explained in more detail with reference to the attached FIGURE, which shows a schematic representation of a transmission of countershaft design with two countershafts.

DETAILED DESCRIPTION OF THE PREFERRED EMBODIMENTS

Figure 1:
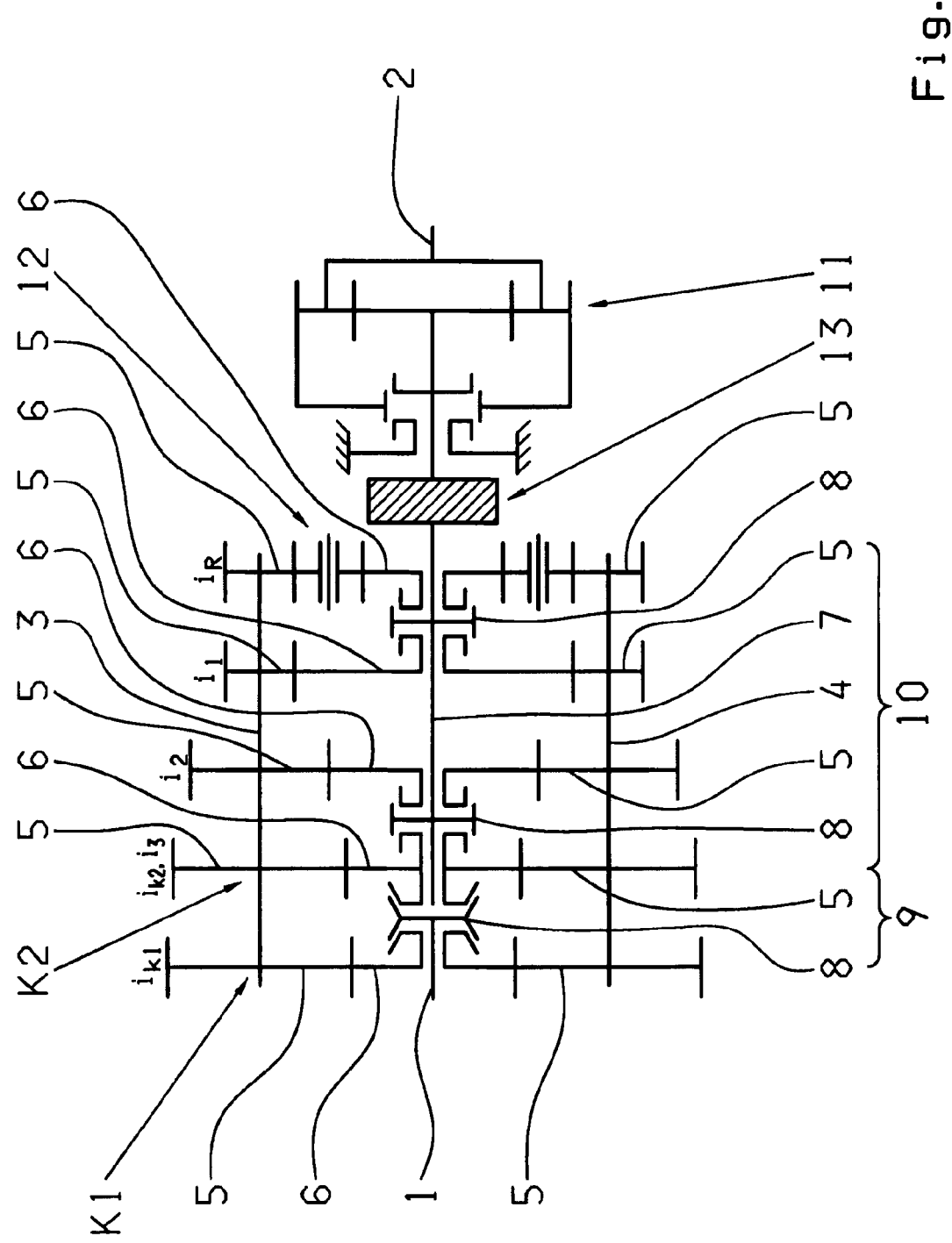

The general structure of countershaft transmissions with two countershafts is very familiar to those having knowledge of the field, so the description of the FIGURE will deal with and explain only those components which are relevant to the invention.

In the attached FIGURE a transmission of countershaft design is shown. In accordance with the prior art it comprises an input shaft 1, a drive output shaft 2 and two countershafts 3, 4, on which are arranged fixed wheels 5 which, to produce a transmission ratio step, mesh with corresponding loose wheels 6 on the input shaft 1 and the main shaft 7. By actuating shift elements 8, the loose wheels 6 can be connected in a rotationally fixed manner to the input shaft 1 or the main shaft 7. The power to be transmitted divides between the countershafts 3, 4 and flows back to the main shaft 7. In addition, an assembly 12 is provided for producing the reverse gear.

In a manner known per se, the transmission shown comprises a splitter group 9 with two input constants K1 and K2, a main transmission 10 and a range group 11 of planetary structure; however, the concept of the invention is not limited to the three-group transmission shown, but can be used in any transmission of countershaft design that comprises two countershafts and a load-equalizing main shaft.

In accordance with the invention the oil pump 13 of the transmission is arranged on and driven by the main shaft 7, which results in a significant reduction of rattling; the play of the oil pump rotor is larger than the play of the main shaft 7 required for load equalization. As is made clear with reference to the attached FIGURE, when viewed axially the oil pump is preferably arranged in the vicinity of the assembly 12 for producing the reverse gear.

Any oil pump known from the prior art can be used as the oil pump, for example a pump with internal gearing.

INDEXES

1 Input shaft
2 Drive output
3 Countershaft
4 Countershaft
5 Fixed wheel
6 Loose wheel
7 Main shaft
8 Shift element
9 Splitter group
10 Main transmission
11 Range group
12 Device for producing the reverse gear
13 Oil pump

The invention claimed is:

1. An arrangement, for reducing rattling in a transmission of countershaft design, comprising:
   first and second countershafts (3, 4), and
   a load-equalizing main shaft (7),
   in which individual gears are produced by activating, in each case, a transmission ratio step comprising a loose wheel (6) arranged on the main shaft (7) and a respective fixed wheel (5) arranged on each of the first and second countershafts (3, 4) which are in active engagement with one another;
   the activation of the transmission ratios taking place by actuating a shift element (8) by which the respective loose wheel is connected, in a rotationally fixed manner, to the main shaft (7); and
   an oil pump (13) of the transmission being arranged on the main shaft (7).

2. The arrangement for reducing rattling in a transmission of countershaft design according to claim 1, wherein the oil pump (13) of the transmission is axially arranged on the main shaft (7) in a vicinity of a device (12) which produces a reverse gear.

3. The arrangement for reducing rattling in a transmission of countershaft design according to claim 2, wherein play of a rotor of the oil pump (13) is larger than play of the main shaft (7) which is required for load equalization.

4. The arrangement for reducing rattling in a transmission of countershaft design according to claim 1, wherein the oil pump (13) is an internal gear pump.

5. A transmission arrangement comprising:
   first and second countershafts (3, 4), each having a reverse gear wheel (5) and plurality of other gear wheels (5) rotationally fixed thereto;
   a load-equalizing main shaft (7) supporting a reverse loose gear wheel (6), a plurality of other loose gear wheels (6) and a plurality of shift elements (8), the reverse loose gear wheel (6) communicating with the reverse gear wheels (5) forming a reverse gear assembly (12), each of the loose gear wheels (6) being engagable, via one of the shift elements (8), with respective gear wheels (5) of the countershafts (3, 4) to engage an associated gear ratio; and
   a transmission oil pump (13) being supported on and driven by the main shaft (7), axially adjacent the reverse gear assembly (12).

\* \* \* \* \*